(12) United States Patent
Okamine et al.

(10) Patent No.: US 11,812,326 B2
(45) Date of Patent: Nov. 7, 2023

(54) CHECK-IN DETERMINING DEVICE

(71) Applicant: NTT DOCOMO, INC., Chiyoda-ku (JP)

(72) Inventors: Tadashi Okamine, Chiyoda-ku (JP); Kazuya Sasaki, Chiyoda-ku (JP); Shoichi Horiguchi, Chiyoda-ku (JP); Masatoshi Kimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 307 days.

(21) Appl. No.: 17/281,843

(22) PCT Filed: Jul. 22, 2019

(86) PCT No.: PCT/JP2019/028707
§ 371 (c)(1),
(2) Date: Mar. 31, 2021

(87) PCT Pub. No.: WO2020/079907
PCT Pub. Date: Apr. 23, 2020

(65) Prior Publication Data
US 2022/0030378 A1 Jan. 27, 2022

(30) Foreign Application Priority Data
Oct. 18, 2018 (JP) ................. 2018-196594

(51) Int. Cl.
*H04W 4/021* (2018.01)
(52) U.S. Cl.
CPC .................. *H04W 4/021* (2013.01)
(58) Field of Classification Search
CPC ..... H04W 4/021; H04W 4/022; H04W 4/023; H04W 4/024; H04W 4/025; H04W 4/029; H04W 12/06; H04W 12/63; H04W 12/64
See application file for complete search history.

(56) References Cited

U.S. PATENT DOCUMENTS

| 10,003,925 B1* | 6/2018 | Zhao | H04W 4/029 |
| 10,397,395 B2* | 8/2019 | Subramanian | H04W 68/005 |

(Continued)

FOREIGN PATENT DOCUMENTS

JP  2017-84411 A  5/2017

OTHER PUBLICATIONS

International Search Report dated Oct. 21, 2019 in PCT/JP2019/028707 filed on Jul. 22, 2019, 1 page.

(Continued)

*Primary Examiner* — Jean A Gelin
(74) *Attorney, Agent, or Firm* — Oblon, McClelland, Maier & Neustadt, L.L.P.

(57) ABSTRACT

A check-in determination apparatus 1 configured to determine check-in indicating that a terminal 2 has entered a geofence which is a prescribed geographic area includes: a related geofence information storage unit 12 configured to store related geofence information in which a related geofence which is another geofence is correlated with each geofence on the basis of a distance to the geofence; a check-in determination unit 14 configured to determine check-in of the terminal 2 sequentially with respect to each of the geofences. When it is determined that the terminal 2 has checked into one geofence, the check-in determination unit 14 excludes the related geofence correlated with the one geofence in the related geofence information stored by the related geofence information storage unit 12 from determination targets in subsequent determination.

6 Claims, 11 Drawing Sheets

(56) References Cited

U.S. PATENT DOCUMENTS

| | | | |
|---|---|---|---|
| 10,878,439 B2* | 12/2020 | Kothe | G06Q 30/0261 |
| 10,939,229 B2* | 3/2021 | Deluca | H04W 4/027 |
| 2013/0275198 A1* | 10/2013 | Zeto, III | G06Q 30/0225 |
| | | | 705/14.26 |
| 2014/0155094 A1* | 6/2014 | Zises | H04W 4/021 |
| | | | 455/456.3 |
| 2014/0279123 A1* | 9/2014 | Harkey | G06Q 30/0619 |
| | | | 705/26.1 |
| 2015/0281889 A1* | 10/2015 | Menendez | H04W 4/021 |
| | | | 455/456.1 |
| 2015/0310490 A1* | 10/2015 | Meredith | G06Q 30/0261 |
| | | | 705/14.58 |
| 2016/0116274 A1* | 4/2016 | Meredith | G01C 21/20 |
| | | | 702/150 |
| 2017/0116651 A1* | 4/2017 | Greenberger | H04W 4/022 |
| 2017/0171703 A1* | 6/2017 | Maheswaranathan | |
| | | | H04M 1/72457 |
| 2018/0033024 A1* | 2/2018 | Latapie | G06V 20/53 |
| 2018/0288564 A1* | 10/2018 | Ellis | H04L 67/55 |
| 2019/0313204 A1* | 10/2019 | Ayoub | H04W 4/35 |
| 2020/0145783 A1* | 5/2020 | Hanada | G06F 16/909 |
| 2021/0127225 A1* | 4/2021 | Viitala | G01S 5/02521 |
| 2022/0044533 A1* | 2/2022 | Branscomb | H04W 4/021 |
| 2022/0114873 A1* | 4/2022 | Williams | G08B 21/0269 |
| 2022/0377494 A1* | 11/2022 | Jones | G06F 21/604 |

OTHER PUBLICATIONS

International Preliminary Report on Patentability and Written Opinion of the International Searching Authority dated Apr. 29, 2021 in PCT/JP2019/028707 (submitting English translation only), 6 pages.

* cited by examiner

Fig.4

| POINT NAME | Lat | Lon | RADIUS |
|---|---|---|---|
| 0 | 35.67160100466009 | 139.74065636676073 | 50 |
| 1 | 35.6708913682185 | 139.73963190416305 | 200 |
| ⋮ | ⋮ | ⋮ | ⋮ |

Fig.8

| POINT NAME | Lat | Lon | RADIUS | RELATED GEOFENCE |
|---|---|---|---|---|
| 0 | 35.6716010046609 | 139.740656366076073 | 50 | 1 |
| 1 | 35.6708913682185 | 139.7396319041630S | 200 | ... |
| ... | ... | ... | ... | ... |

CHECK-IN DETERMINING DEVICE

TECHNICAL FIELD

An aspect of the present disclosure relates to a check-in determination apparatus configured to determine check-in indicating that a terminal has entered a geofence which is a prescribed geographic area.

BACKGROUND ART

Patent Literature 1 as below discloses a geofence management system that determines that a user device has entered a boundary of a geofence including a related point of interest.

CITATION LIST

Patent Literature

[Patent Literature 1] Japanese Unexamined Patent Publication No. 2017-84411

SUMMARY OF INVENTION

Technical Problem

Generally, an apparatus that determines check-in of a terminal into geofences determines check-in of a terminal for each of all geofences registered in advance. Therefore, there is a problem that it takes a considerable amount of time in determining check-in of a terminal if there are many geofences registered in advance.

Therefore, an aspect of the present disclosure has been made in view of these problems, and an object thereof is to provide a check-in determination apparatus capable of determining check-in at a higher speed.

Solution to Problem

In order to solve the problems, a check-in determination apparatus according to an aspect of the present disclosure is a check-in determination apparatus configured to determine check-in indicating that a terminal has entered a geofence which is a prescribed geographic area, including: a storage unit configured to store related geofence information in which a related geofence which is another geofence is correlated with each geofence on the basis of a distance to the geofence; a determination unit configured to determine check-in of the terminal sequentially with respect to each of the geofences, wherein when it is determined that the terminal has checked into one geofence, the determination unit excludes the related geofence correlated with the one geofence in the related geofence information stored by the storage unit from determination targets in subsequent determination.

According to such a check-in determination apparatus, in the check-in determination of the terminal, when it is determined that the terminal has checked into one geofence, a related geofence correlated on the basis of the distance to the one geofence is excluded from determination targets. This is based on the fact that, for example, when the terminal has checked into one geofence, since it is highly likely that the terminal has checked into a related geofence correlated on the basis of the distance to the one geofence, the determination for the related geofence can be omitted. In this manner, since the geofences which are determination targets of the check-in can be reduced, it is possible to determine check-in at a higher speed.

Advantageous Effects of Invention

According to an aspect of the present disclosure, it is possible to determine check-in at a higher speed.

BRIEF DESCRIPTION OF DRAWINGS

FIG. 2 is a diagram for describing check-in.

FIG. 4 is a diagram illustrating an example of a geofence information table.

FIG. 8 is a diagram illustrating an example of a related geofence information table.

DESCRIPTION OF EMBODIMENTS

Hereinafter, an embodiment of a check-in determination apparatus will be described in detail with reference to the accompanying drawings. In description with reference to the drawings, the same elements will be referred to by the same reference signs and redundant description thereof will be omitted. In the following description, the embodiments are specific examples of the present invention, and the present invention is not limited to these embodiments unless particularly stated otherwise.

Figure 1:
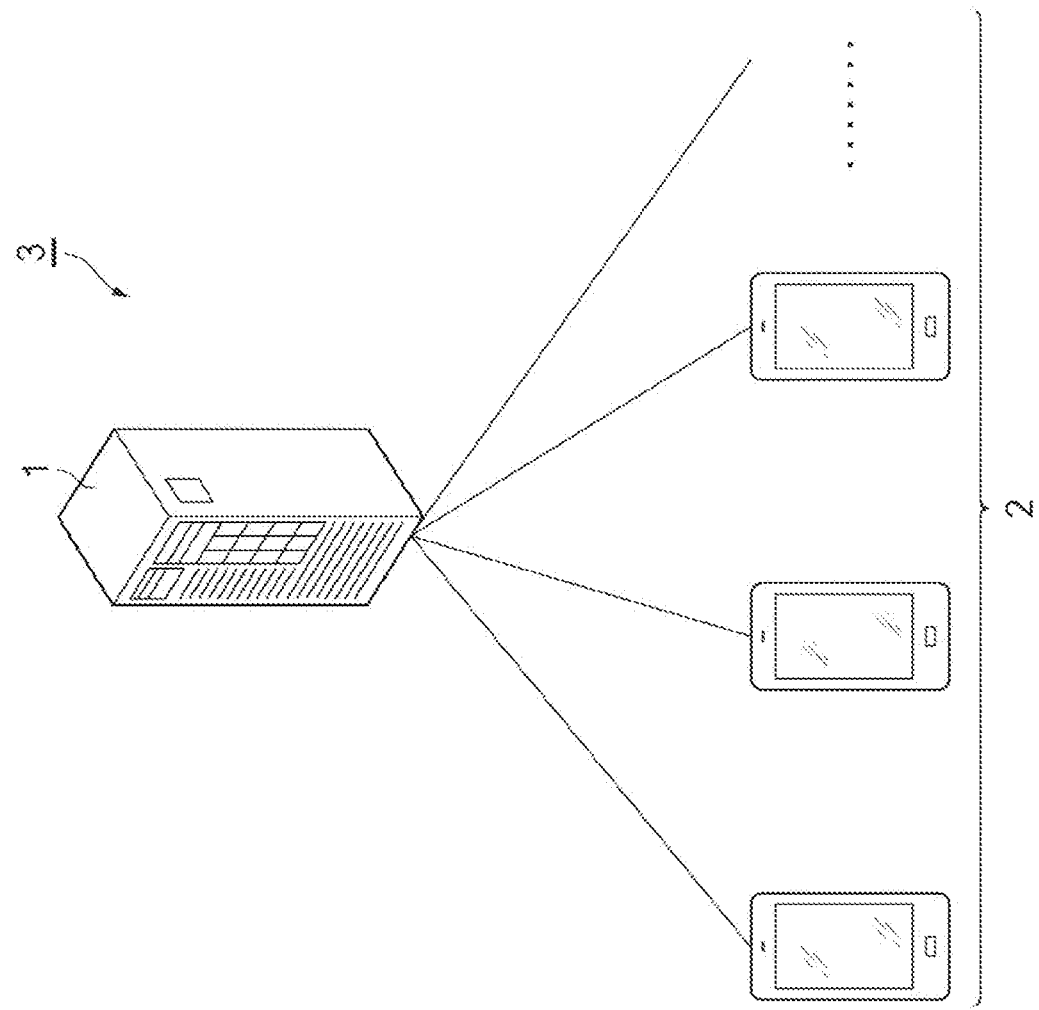
FIG. 1 is a conceptual diagram of a check-in determination system according to an embodiment of the present invention.

FIG. 1 is a conceptual diagram of a check-in determination system 3. As illustrated in FIG. 1, the check-in determination system 3 includes a check-in determination apparatus 1 and one or more terminals 2. The check-in determination apparatus 1 and the terminals 2 are connected by a network such as a mobile communication network or a wireless local area network (LAN) so as to be accessible to each other.

The check-in determination apparatus 1 is a computer apparatus such as a server. The check-in determination apparatus 1 determines check-in indicating that the terminal 2 has entered a geofence which is a prescribed geographic area. The details of the functions of the check-in determination apparatus 1 will be described later.

Specifically, a geofence is a virtual geographic boundary or region (area) set in a real-world arbitrary position. In the present embodiment, although a geofence is represented as a circle defined by the center indicated by a latitude and a longitude and a radius indicated by a distance, there is no limitation thereto. For example, a geofence may be a geographic area surrounded by arbitrary curves and/or lines. Moreover, for example, a geofence is not limited to a 2-dimensional space and may be a range spreading in a 3-dimensional space such as a sphere or a solid.

Specifically, check-in indicates that the terminal 2 has crossed a geographic boundary of a geofence or the terminal 2 has entered the region of a geofence. Checking-in indicates that the terminal 2 crosses a geographic boundary of a geofence or the terminal 2 enters the region of a geofence. Determining check-in means determining whether the terminal 2 has checked into (entered) a geofence or determining that the terminal 2 has checked into (entered) a geofence. An example of the use of the determination of check-in is a purchase inducing mechanism in which a geofence is set in advance around a certain store, and when it is determined that the terminal 2 carried by a user has checked into the geofence (that is, has approached the store), a coupon for the store is distributed to the terminal 2, and the user looks at the distributed coupon and visits the store with an increased buying intention.

Figure 2:
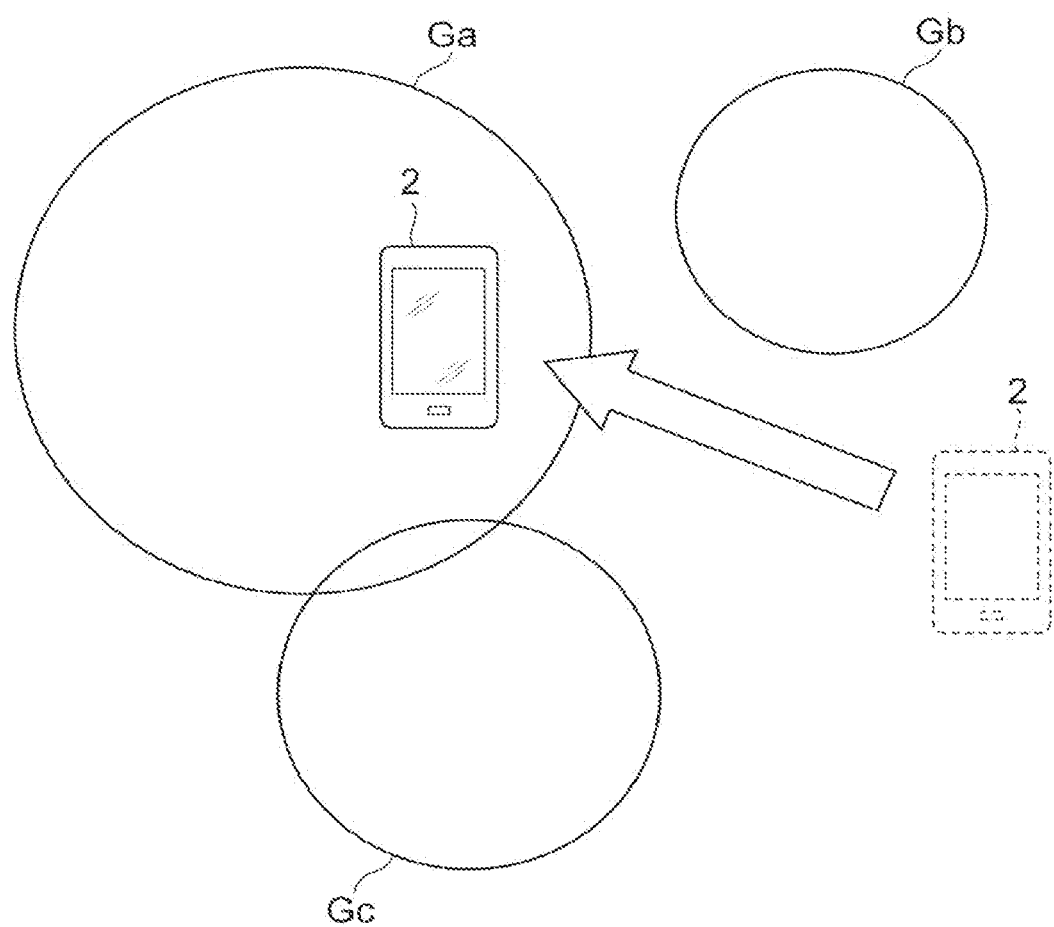

FIG. 2 is a diagram for describing check-in. As illustrated in FIG. 2, three geofences Ga, Gb, and Gc are formed in advance. FIG. 2 illustrates a scene in which the terminal 2 moves into the geofence Ga and the terminal 2 checks into the geofence Ga. The terminal 2 may check-in a plurality of geofences at a time. For example, in FIG. 2, when the terminal 2 has moved to an overlapping range of the geofences Ga and Gc, the terminal 2 checks into the geofences Ga and Gc.

The terminal 2 is a computer apparatus such as a smartphone. The terminal 2 may be carried by a user and may be provided in a machine or an apparatus such as an automobile. Although it is assumed that the terminal 2 moves geographically, there is no limitation thereto.

The terminal 2 transmits position identifying information capable of identifying the position of the terminal 2 to the check-in determination apparatus 1 (specifically, a position identifying information acquisition unit 13 thereof to be described later). The transmission timing may be periodical (for example, once a minute) and may be an arbitrary timing based on an instruction or the like of the user or the check-in determination apparatus 1. Specifically, the position identifying information is Lat (Latitude) and Lon (Longitude) which are the latitude and longitude acquired by a global positioning system (GPS) included in the terminal 2 or a service set identifier (SSID) or a basic service set identifier (BSSID) related to a network that the terminal 2 is accessing. However, there is no limitation thereto, and arbitrary information may be used as long as it can identify the position of the terminal 2. Although the position of the terminal 2 based on SSID or BSSID can be identified on the basis of the position information (latitude and longitude and the like) registered in advance of a network relay apparatus such as an access point indicated by the SSID or the BSSID, there is no limitation thereto. Hereinafter, in the present embodiment, although the position identifying information is described as the latitude and longitude, the position identifying information may be appropriately replaced with SSID or BSSID or another information capable of identifying the position. Furthermore, the position identifying information may include a universally unique identifier (UUID) which is identification information of the terminal 2 and datetime (date and time) indicating the timing at which the position identifying information was acquired.

The terminal 2 may receive a determination result of the check-in determination apparatus 1 or information based on the determination result from the check-in determination apparatus 1 or another apparatus connected via the network and display the same to a user. For example, the terminal 2 may receive and display information indicating that it has checked into a certain geofence or coupon information or the like related to a coupon of a store when it is determined that the terminal 2 has checked into a geofence formed by the store.

Figure 3:
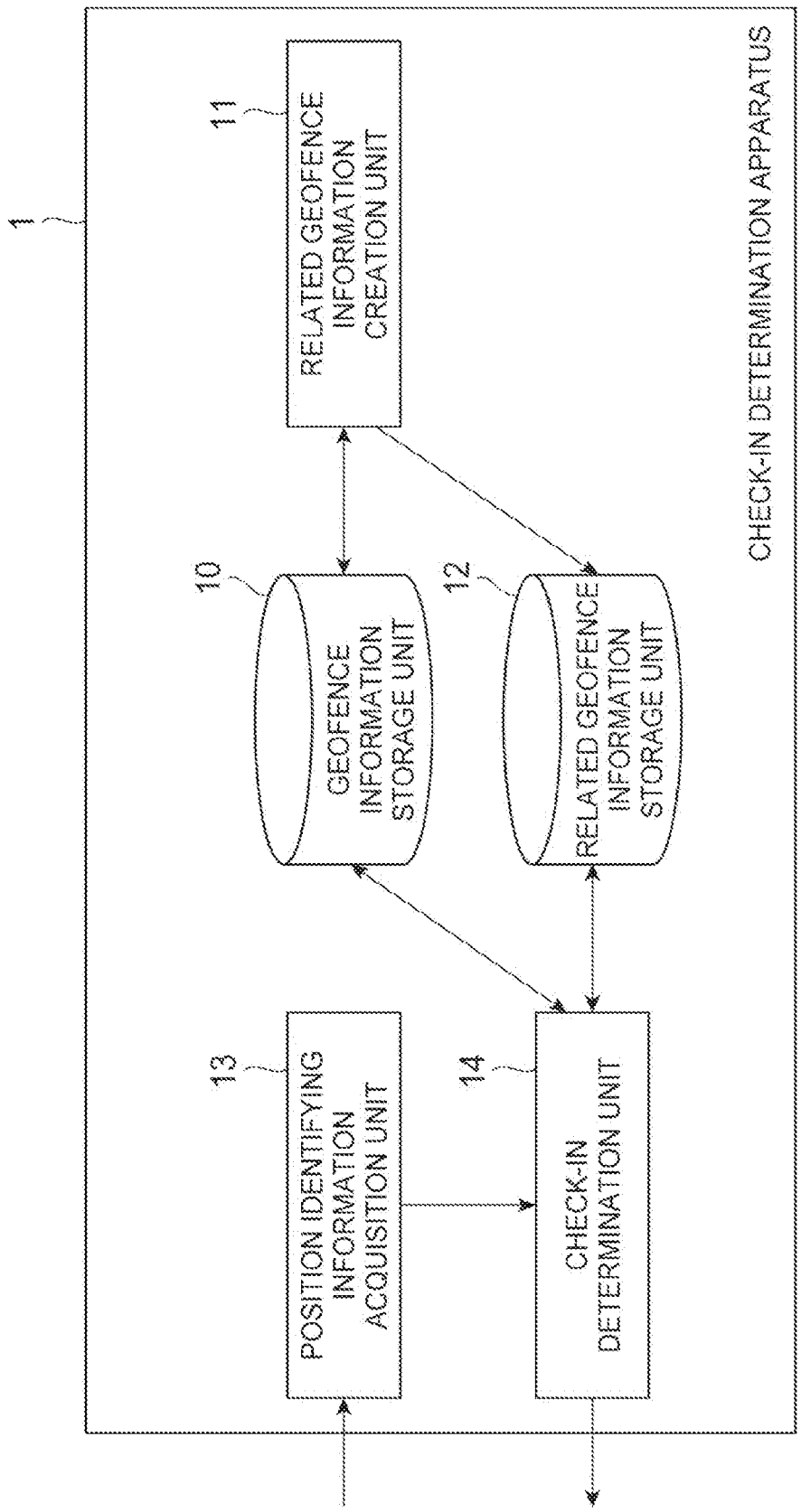
FIG. 3 is a functional block diagram of a check-in determination apparatus according to an embodiment of the present invention.

FIG. 3 is a functional block diagram of the check-in determination apparatus 1. As illustrated in FIG. 3, the check-in determination apparatus 1 includes a geofence information storage unit 10, a related geofence information creation unit 11 (a creation unit), a related geofence information storage unit 12 (a storage unit), a position identifying information acquisition unit 13, and a check-in determination unit 14 (a determination unit). Hereinafter, the respective functional blocks of the check-in determination apparatus 1 illustrated in FIG. 3 will be described.

The geofence information storage unit 10 stores geofence information which is information related to a geofence. Specifically, the geofence information is information that defines a geofence. FIG. 4 is a diagram illustrating an example of a geofence information table. As illustrated in FIG. 4, the geofence information is correlated with a point name which is the name for identifying a geofence, Lat which is the latitude of the center of the geofence, Lon which is the longitude of the center of the geofence, and the radius of the geofence. For example, the first record of the example of the geofence information table illustrated in FIG. 4 indicates that the point name of the geofence is "0", the latitude and longitude of the center of the geofence are "35.67160100466009" and "139.74065636676073", respectively, and the radius of the geofence is "50" meters. The geofence information may include a portion of the point name, Lat, Lon, and the radius and may include other information in correlation. The geofence information may be created in advance by an administrator or the like of the check-in determination apparatus 1, and a computer apparatus may create the same mechanically on the basis of the information related to the existing geofences.

Although it is assumed that the geofence information stored by the geofence information storage unit 10 is information related to all geofences set or registered in advance for a specific region or area, there is no limitation thereto. Moreover, the pieces of geofence information stored by the geofence information storage unit 10 may be sorted (rearranged) in ascending order of the geographic areas of the geofences.

The related geofence information creation unit 11 creates related geofence information in which a related geofence which is another geofence is correlated with each geofence on the basis of a distance to the geofence on the basis of the geofence information stored by the geofence information storage unit 10. For example, the related geofence information creation unit 11 may create related geofence information in which another geofence indicated by the geofence information, of which the geographic area is included even partially in a prescribed distance (for example, 100 meters) from the center of the geofence or an arbitrary point in the geofence is correlated with each of the geofences indicated by the pieces of geofence information stored by the geofence information storage unit 10 as a related geofence.

Figure 5:
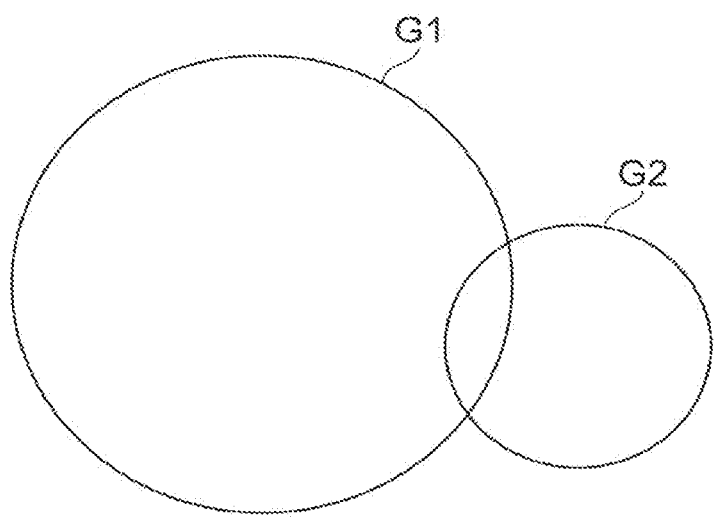
FIG. 5 is a first diagram for describing a related geofence.

The related geofence information creation unit 11 may create related geofence information in which a related geofence that at least a portion of the geographic area of the geofence overlaps (partially overlaps) is correlated with each geofence. For example, in FIG. 5, since at least a portion of the geographic area of the geofence G1 overlaps the geofence G2, the related geofence information creation unit 11 creates the related geofence information in which the geofence G2 is correlated with the geofence G1 as a related geofence. Specifically, the related geofence information creation unit 11 creates related geofence information in which another geofence that at least a portion of the geographic area of a geofence overlaps among the other geofences indicated by the pieces of geofence information is correlated with each of the geofences indicated by the pieces of geofence information stored by the geofence information storage unit 10 as a related geofence.

Figure 6:
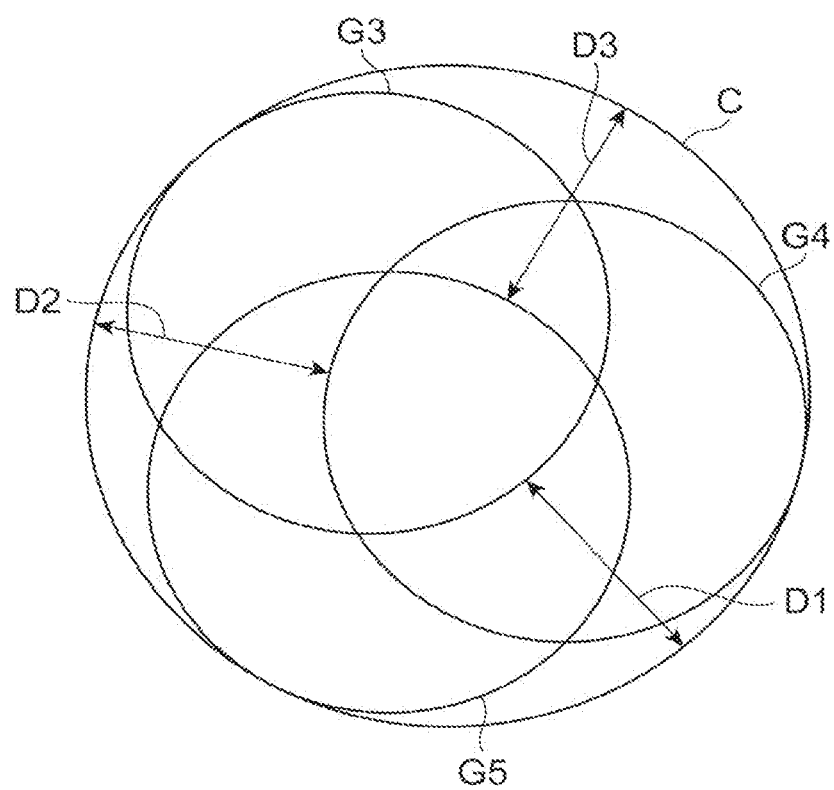
FIG. 6 is a second diagram for describing a related geofence.

The related geofence information creation unit 11 may set a circumcircle of each of the geofences indicated by the pieces of geofence information stored by the geofence information storage unit 10 and another geofence that at least a portion of the geographic area of the geofence overlaps among the other geofences indicated by the pieces of geofence information and may create related geofence information in which the other overlapping geofences are correlated as related geofences when all the distances of the other overlapping geofences and the corresponding geofence, from each geofence to the circumcircles are equal to or smaller than a prescribed setting value. For example, in FIG. 6, when the other geofences that at least a portion of the geographic area of the geofence G3 overlaps are the geofences G4 and G5, the circumcircle of the geofences G3, G4, and G5 is a circumcircle C, and the (largest) distance D1 from the geofence G3 to the circumcircle C, the (largest) distance D2 from the geofence G4 to the circumcircle C, and the (largest) distance D3 from the geofence G5 to the circumcircle C are all equal to or smaller than the prescribed setting value, the related geofence information creation unit 11 creates related geofence information in which the geofences G4 and G5 are correlated with the geofence G3 as related geofences. The prescribed setting value may be set arbitrarily in advance by an administrator or the like of the check-in determination apparatus 1. The prescribed setting value may be a (measurement) error (to be described later) (for example, 50 meters) of the position identifying information of the terminal 2 or a value based on the terminal, for example.

In the above description, a "circumcircle" may be replaced with an "inclusive range". More specifically, the related geofence information creation unit 11 may set, for each geofence, a inclusive range that includes each of the geofences indicated by the pieces of geofence information stored by the geofence information storage unit 10 and another geofence that at least a portion of the geographic area of the geofence overlaps among the other geofences indicated by the pieces of geofence information and may create related geofence information in which the other overlapping geofences are correlated as related geofences when all the distances of the other overlapping geofences and the corresponding geofences, from each geofence to the inclusive ranges are equal to or smaller than a prescribed setting value. An example of the inclusive range is a circle having the smallest radius that includes (the other geofences and the geofence) and a polygon that circumscribes (the other geofences and the geofence).

Figure 7:
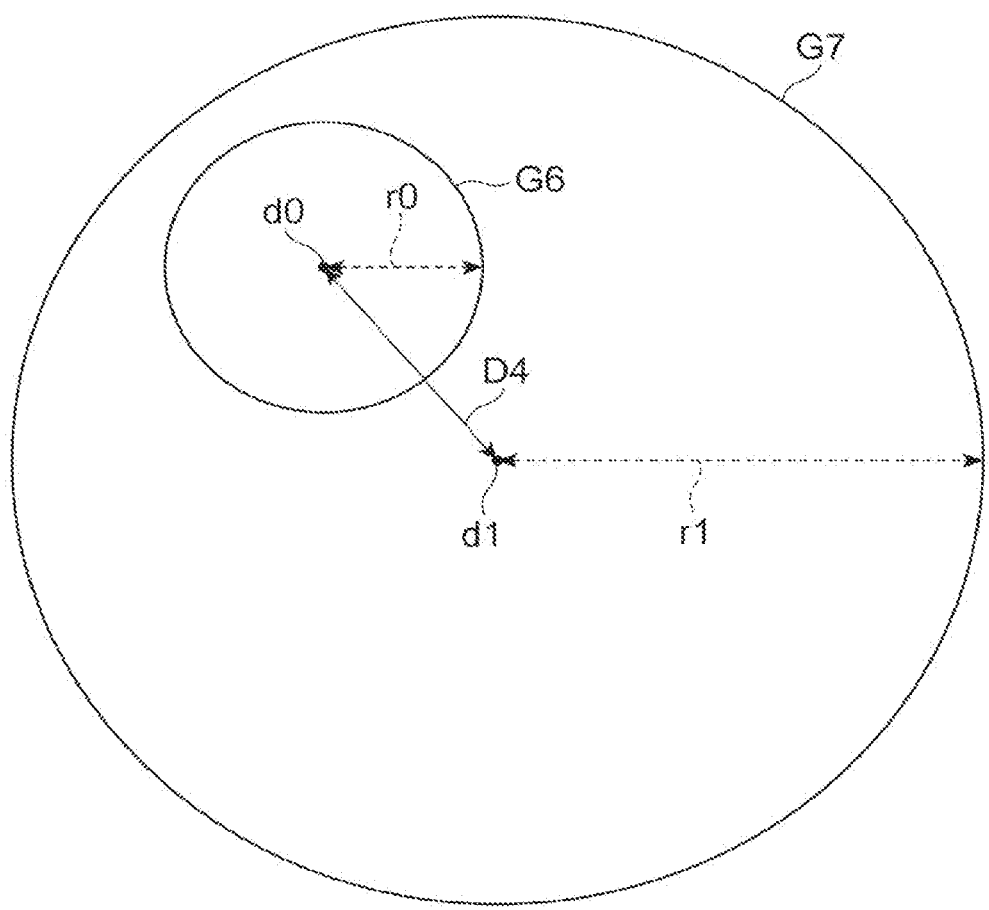
FIG. 7 is a third diagram for describing a related geofence.

The related geofence information creation unit 11 may create related geofence information in which related geofences that include (are in a completely inclusive relationship with) all geographic areas of each geofence are correlated with each geofence. For example, in FIG. 7, since the geofence G7 includes all geographic areas of the geofence G6, the related geofence information creation unit 11 creates related geofence information in which the geofence G7 is correlated with the geofence G6 as a related geofence. More specifically, the related geofence information creation unit 11 creates related geofence information in which another geofence in which the distance (for example, D4 in FIG. 7) between the center (for example, d0 in FIG. 7) of each of the geofences indicated by the pieces of geofence information stored by the geofence information storage unit 10 and the center (for example, d1 in FIG. 7) of the other geofence is smaller than an absolute value (or equal to or smaller than the absolute value) of a difference between the radius (for example, r0 in FIG. 7) of the geofence and the radius (for example, r1 in FIG. 7) of the other geofence among the other geofences indicated by the pieces of the geofence information is correlated with each of the geofences indicated by the pieces of geofence information as a related geofence. The above relationship is represented by a formula "If(Distance(d0,d1)<|r0−r1|) then "Inclusive")".

The related geofence information creation unit 11 may sort the geofences (the geofences illustrated in a "point name" field to be described later) in ascending order of the geographic areas when the related geofence information is created. That is, the related geofence information may be sorted in ascending order of the geographic areas of the geofences.

FIG. 8 is a diagram illustrating an example of a related geofence information table. As illustrated in FIG. 8, the related geofence information is correlated with a point name which is the name for identifying a geofence, Lat which is the latitude of the center of the geofence, Lon which is the longitude of the center of the geofence, the radius of the geofence, and a point name of a related geofence that includes all geographic areas of the geofence. For example, the first record of the example of the related geofence information table illustrated in FIG. 8 indicates that a geofence of which the point name is "0", the latitude and longitude of the center are "35.67160100466009" and "139.74065636676073", respectively, and the radius is "50" meters is correlated with a geofence of the point name "1" as a related geofence that includes all geographic areas of the geofence. A plurality of geofences may be correlated as the related geofences. The related geofence information may include a portion of the point name, Lat, Lon, the radius, and the point name of the related geofence and may include other information in correlation. The point name of the related geofence may be set in advance by an administrator or the like of the check-in determination apparatus 1.

Figure 9:
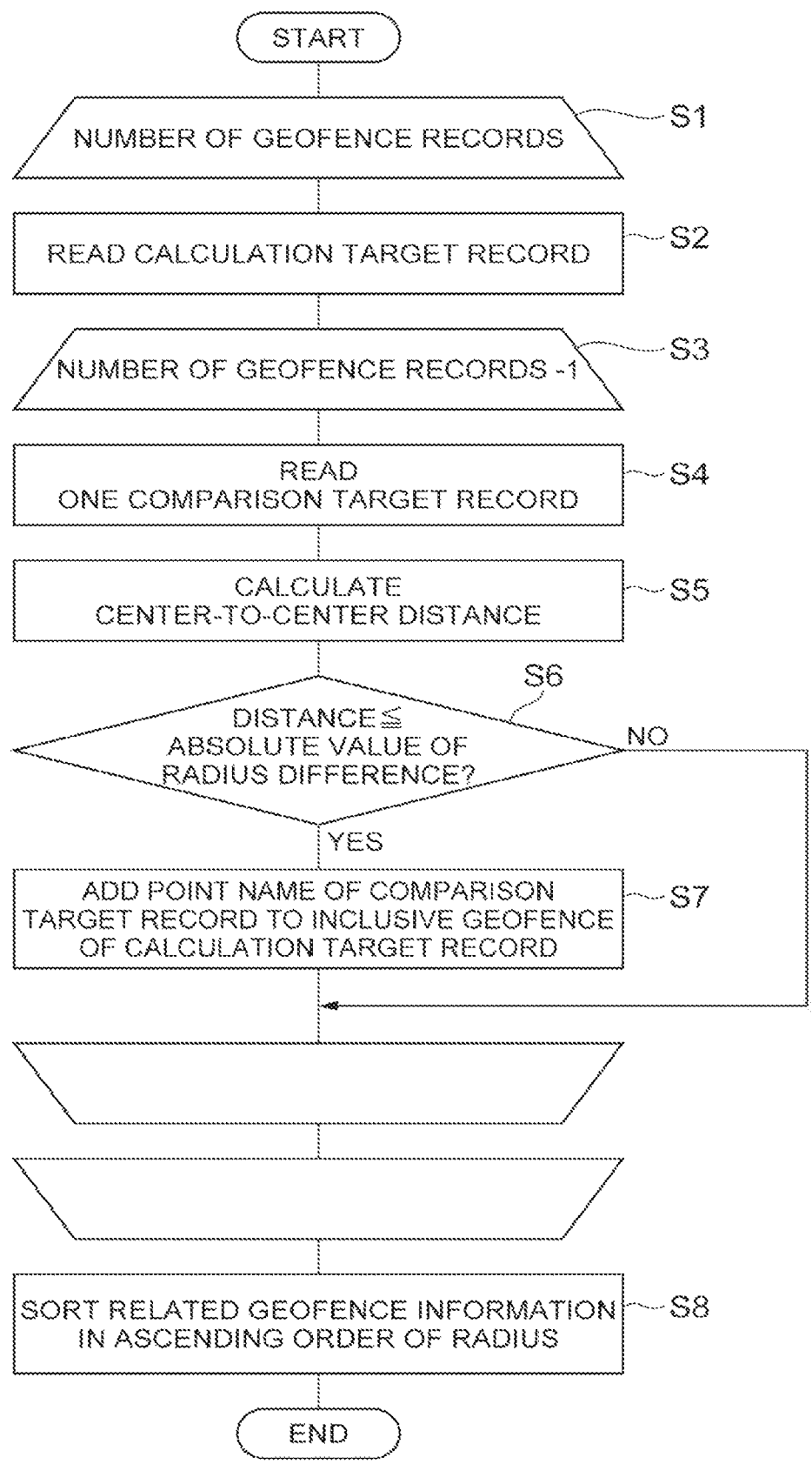
FIG. 9 is a flowchart illustrating an example of a related geofence information creation process.

FIG. 9 is a flowchart illustrating an example of a related geofence information creation process by the related geofence information creation unit 11. First, a loop process (S1 loop) of reading the geofence information stored in the geofence information storage unit 10 and performing the subsequent processes of S2 to S7 repeatedly with respect to the respective records is executed (step S1). In the S1 loop, first, a calculation target record which is a target record of this loop is read from the geofence information read in step S1 (step S2). Moreover, in step S2, the record (point name, Lat, Lon, and radius) of a geofence indicated by the calculation target record among the pieces of geofence information read in step S1 is set as a new record of the related geofence information to be created.

Subsequently, a loop process (S3 loop) of performing the subsequent processes of S3 to S7 repeatedly with respect to each record other than the calculation target record among the pieces of geofence information read in step S1 is executed (step S3). In the S3 loop, first, a comparison target record which is a target record of this loop is read from the pieces of geofence information (other than the calculation target record) read in step S1 (step S4). Subsequently, the distance between the center of the geofence indicated by the calculation target record read in step S2 and the center of the geofence indicated by the comparison target record read in step S4 is calculated (step S5).

Subsequently, it is determined whether the distance calculated in step S5 is equal to or smaller than an absolute value of the difference between the radius of the geofence indicated by the calculation target record read in step S2 and the radius of the geofence indicated by the comparison target record read in step S4 (step S6). When it is determined in step S6 that the distance is equal to or smaller than the absolute value (S6: YES) (that is, when it is determined that the geofence indicated by the comparison target record includes all geographic areas of the geofence indicated by the calculation target record), a point name of the comparison target record is additionally correlated with a new record of the related geofence information set in step S2 as a point name of the related geofence (step S7).

Subsequently to step S7 or when it is determined in step S6 that the distance is larger than the absolute value (S6: NO) (that is, it is determined that the geofence indicated by the comparison target record does not include all geographic areas of the geofence indicated by the calculation target record), the S3 loop proceeds to a subsequent loop (the S3 loop is executed with respect to a subsequent comparison target record). After all loops in the S3 loop are completed (after the S3 loop is executed with respect to all comparison target records), the S1 loop proceeds to a subsequent loop (the S1 loop is executed with respect to a subsequent calculation target record). After all loops in the S1 loop are completed (after the S1 loop is executed with respect to all calculation target records), the records of the created related geofence information are sorted in ascending order of the radii of the records (step S8), and the related geofence information creation process ends.

The process of step S8 may be omitted. In the flowchart illustrated in FIG. 9, a creation example of the related geofence information in which a related geofence that includes all geographic areas of the geofence is correlated with each geofence is illustrated. However, the processes of steps S5 to S7 may be replaced appropriately, so that a creation example of the related geofence information in which a related geofence which is another geofence is correlated with each geofence on the basis of the distance to the geofence, and a creation example of the related geofence information in which a related geofence that at least a portion of the geographic area of each geofence overlaps is correlated with each geofence may be realized.

The creation of the related geofence information by the related geofence information creation unit 11 may be executed periodically (for example, once a day) and may be executed irregularly on the basis of an instruction of an administrator or the like of the check-in determination apparatus 1. The creation of the related geofence information by the related geofence information creation unit 11 is executed independently from and earlier than the determination of check-in by the check-in determination apparatus 1 (the check-in determination unit 14 thereof). That is, a processing time of the determination of check-in by the check-in determination apparatus 1 (the check-in determination unit 14 thereof) is not influenced by a processing time of the creation of the related geofence information by the related geofence information creation unit 11. The creation of the related geofence information by the related geofence information creation unit 11 may be executed at the timing of the determination of check-in by the check-in determination apparatus 1 (the check-in determination unit 14 thereof).

The related geofence information storage unit 12 stores related geofence information. Specifically, the related geofence information storage unit 12 stores the related geofence information created by the related geofence information creation unit 11.

The position identifying information acquisition unit 13 acquires the position identifying information of the terminal 2. Specifically, the position identifying information acquisition unit 13 receives and acquires the position identifying information transmitted from the respective terminals 2. The position identifying information acquisition unit 13 may acquire the position identifying information (indirectly) from the memory or the like of the check-in determination apparatus 1 without being limited to the terminals 2. The position identifying information acquisition unit 13 outputs the acquired position identifying information to the check-in determination unit 14.

The check-in determination unit 14 determines check-in of the terminal 2 sequentially with respect to geofences (of all geofences that are set or registered in advance). More specifically, the check-in determination unit 14 determines check-in of the terminal 2 by determining whether the position of the terminal 2 identified by the position identifying information is included in each of the geofences included in the geofence information or the related geofence information sequentially on the basis of the geofence information stored by the geofence information storage unit 10 or the related geofence information stored by the related geofence information storage unit 12 and the position identifying information acquired (input) by the position identifying information acquisition unit 13.

When it is determined that the terminal 2 has checked into one geofence, the check-in determination unit 14 excludes a related geofence correlated with the one geofence in the related geofence information stored by the related geofence information storage unit 12 from determination targets in the subsequent determination. For example, when the related geofence information stored by the related geofence information storage unit 12 is the table example of the related geofence information illustrated in FIG. 8, and when the check-in determination unit 14 determines the check-in of the terminal 2 and determines that the terminal 2 has checked into a geofence of which the point name is "0", the geofence identified by the related geofence "1" correlated to the record of the point name "0" in the related geofence information is excluded from the determination targets of the subsequent determination of the check-in determination unit 14. When a plurality of related geofences is correlated with one geofence (in the above example, the geofence identified by the point name "0"), all the plurality of related geofences are excluded from the determination targets in the subsequent determination.

When it is determined that the terminal 2 has checked into one geofence, the check-in determination unit 14 may determine that the terminal 2 has checked into a related geofence correlated with the one geofence in the related geofence information stored by the related geofence information storage unit 12. For example, in the example of FIG. 8, it may be determined that the terminal 2 has checked into a geofence identified by the related geofence of "1". When a plurality of related geofences is correlated with one geofence (in the example of FIG. 8, the geofence identified by the point name of "0"), it may be determined that the terminal 2 has checked into all the plurality of related geofences.

The check-in determination unit 14 may determine check-in of the terminal 2 in ascending order of the geographic areas with respect to the geofences. More specifically, the check-in determination unit 14 may determine check-in of the terminal 2 in a sorted order of the geofences of the geofence information or the related geofence information sorted in advance in ascending order of the geographic areas. Alternatively, the check-in determination unit 14 may sort the geofences of the geofence information or the related geofence information in ascending order of the geographic areas of the geofences and then determine check-in of the terminal 2 with respect to the geofences in the sorted order.

After determining check-in of the terminal 2, the check-in determination unit 14 may transmit (output) the determination result or information based on the determination result to the terminal 2, another function of the check-in determination apparatus 1, or another apparatus. The determination result may include the UUID of the terminal 2, the point name of the geofence for which check-in was determined, and datetime which is the timing at which the position identifying information of the terminal 2 which is a check-in determination target was acquired and may include other information.

Figure 10:
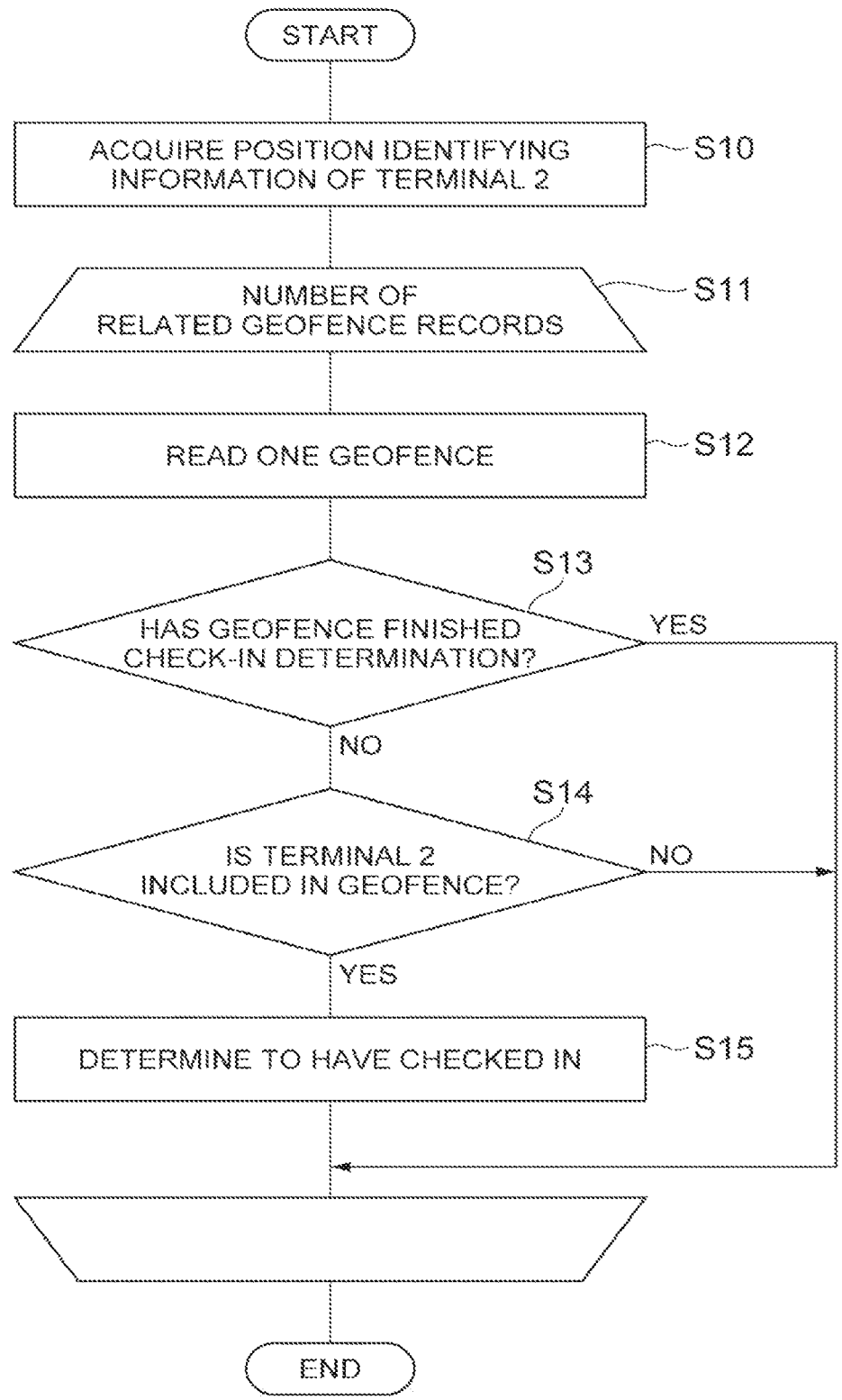
FIG. 10 is a flowchart illustrating an example of a check-in determination process.

A processing example of the check-in determination unit 14 will be described with reference to FIG. 10. FIG. 10 is a flowchart illustrating an example of a check-in determination process by the check-in determination unit 14. The subject of the process is the check-in determination unit 14 unless particularly stated otherwise in the following description.

First, the position identifying information acquisition unit 13 acquires the position identifying information of the terminal 2 (step S10). It is assumed that the position identifying information includes a UUID, Lat, Lon, and datetime. Subsequently, a loop process (S11 loop) of extracting the records of the related geofence information stored by the related geofence information storage unit 12 and performing the subsequent processes of steps S11 to S15 repeatedly with respect to each record is executed (step S11). In the S11 loop, first, a target record (geofence) which is a target record of this loop is read (step S12). Subsequently, it is determined whether the geofence indicated by the target record read in step S12 has finished check-in determination (is excluded from determination targets) (step S13). When it is determined in step S13 that the geofence has not finished check-in determination (is not excluded from determination targets) (S13: NO), it is determined whether the terminal 2 has checked into the geofence indicated by the target record read in step S12 (the terminal 2 is included in the geofence) (step S14). More specifically, it is determined whether the position indicated by the Lat and Lon included in the position identifying information acquired in step S10 is included in a circle of which the radius is the radius of the target record about the position indicated by the Lat and Lon of the target record. When it is determined in step S14 that the terminal 2 has checked into (S14: YES), it is determined that the terminal 2 has checked into and the related geofence correlated with the target record read in step S12 has finished check-in determination (it is determined that the terminal has checked into the related geofence) (temporarily stores information indicating the fact in a memory so that the information is referred to in step S13) and/or is excluded from determination targets in the subsequent determination (temporarily stores information indicating the fact in a memory so that the information is referred to in step S13) (step S15). In step S15, the determination result (for example, information including the UUID of the terminal 2, a point name of the geofence for which check-in has been determined, and datetime which is the timing at which the position identifying information of the terminal 2 which is the determination target of check-in was acquired) or information based on the determination result may be transmitted to the terminal 2, another function of the check-in determination apparatus 1, or another apparatus.

Subsequently to step S15 or when it is determined in step S13 that the related geofence has finished check-in determination (is excluded from determination targets) (S13: YES), or when it is determined in step S14 that the terminal has not checked into (S14: NO), the S11 loop proceeds to a subsequent loop (the S11 loop is executed for the subsequent target record among the records of the related geofence information). After all loops of the S11 loop are completed (after the S11 loop is executed with respect to all target records), the check-in determination process ends.

In description of the check-in determination process, although it has been described that the records of the related geofence information stored by the related geofence information storage unit 12 are used in the S11 loop, there is no limitation thereto, and instead of this, the records of the geofence information stored by the geofence information storage unit 10 may be used. In this case, when the related geofence is extracted in step S15, the related geofence corresponding to the target record may be extracted by referring to the related geofence information stored by the related geofence information storage unit 12.

Next, the effects of the check-in determination apparatus 1 configured as in the present embodiment will be described.

The check-in determination apparatus 1 of the present embodiment includes the related geofence information storage unit 12 that stores the related geofence information in which a related geofence which is another geofence is correlated with each geofence on the basis of the distance to the geofence. The check-in determination unit 14 determines check-in of the terminal 2 sequentially with respect to the respective geofences. When it is determined that the terminal 2 has checked into one geofence, a related geofence correlated with the one geofence in the related geofence information stored by the related geofence information storage unit 12 is excluded from determination targets in the subsequent determination. That is, in the check-in determination of the terminal 2, when it is determined that the terminal 2 has checked into one geofence, a related geofence correlated on the basis of the distance to the one geofence is excluded from determination targets. This is based on the fact that, for example, when the terminal 2 has checked into one geofence, since it is highly likely that the terminal 2 has checked into a related geofence correlated on the basis of the distance to the one geofence, the determination for the related geofence can be omitted. In this manner, since the geofences which are determination targets of the check-in can be reduced, it is possible to determine check-in at a higher speed.

According to the check-in determination apparatus 1 of the present embodiment, when the check-in determination unit 14 determines that the terminal 2 has checked into one geofence, it is determined that the terminal 2 has checked into a related geofence correlated with the one geofence in the related geofence information stored by the related geofence information storage unit 12. This is based on the fact that, for example, when the terminal 2 has checked into one geofence, it is highly likely that the terminal 2 has checked into a related geofence correlated on the basis of the distance to the one geofence. In this manner, since check-in determination for a plurality of geofences can be performed by determining check-in with respect to one geofence, it is possible to determine check-in at a higher speed.

According to the check-in determination apparatus 1 of the present embodiment, a related geofence that at least a portion of the geographic area of each geofence overlaps is correlated with each geofence in the related geofence information. This is based on the fact that, for example, when the terminal 2 has checked into one geofence, it is highly likely that the terminal 2 has checked into a related geofence that at least a portion of the geographic area of the one geofence overlaps.

According to the check-in determination apparatus 1 of the present embodiment, a related geofence including all geographic areas of each geofence is correlated with each geofence in the related geofence information. This is based on the fact that, for example, when the terminal 2 has checked into one geofence, the terminal 2 has checked into a related geofence including all geographic areas of the one geofence.

According to the check-in determination apparatus 1 of the present embodiment, the check-in determination unit 14 determines check-in of the terminal in ascending order of the geographic areas of geofences. Generally, a geofence that includes a certain geofence is a larger (wider) geographic area than the certain geofence. When check-in of the terminal is determined in ascending order of the geographic areas of the geofences, a larger number of related geofences that include all the geographic areas of each geofence can be extracted in an earlier stage, for example. In this way, since a larger number of geofences can be excluded from determination targets (and/or can finish check-in determination) in an earlier stage, it is possible to determine check-in at a higher speed.

The check-in determination apparatus 1 of the present embodiment includes the related geofence information creation unit 11 that creates related geofence information, and the related geofence information storage unit 12 stores the related geofence information created by the related geofence information creation unit 11. In this way, it is possible to create and store related geofence information more reliably at an arbitrary timing, for example.

Here, an apparatus (a conventional apparatus) that determines check-in in the conventional technique will be described. The conventional apparatus performs the following comparison and determines that a terminal has checked into when a condition is satisfied. For example, when the Lat and Lon of a terminal are input, the distance to the position indicated by the Lat and Lon of each record related to a geofence in a DB is calculated and it is compared whether the calculated distance is equal to or smaller than the radius of the geofence. Moreover, for example, when the SSID or BSSID related to network communication of a terminal are input, it is compared whether the input SSID or BSSID match the SSID or BSSID of each record related to the geofence in a DB. In this manner, the computation amount in the conventional apparatus corresponds a multiplication of the number of records in the DB by the number of pieces of input data, and full search is performed (since a terminal may checks in a plurality of geofences, determination is performed for all records in the DB). That is, the conventional apparatus incurs a huge amount of computation and it takes a considerable amount of time in determining check-in of a terminal.

On the other hand, as described above, in the check-in determination apparatus 1 of the present embodiment, the check-in determination is accelerated by reducing the number of geofences to be determined efficiently. More specifically, the check-in determination apparatus 1 decreases the number of determinations by determining whether overlapping geofences will be merged as one target and merging the overlapping geofences. For example, in case of geofences in an inclusive relationship, when check-in with respect to a small geofence (circle) is determined, check-in with respect to a larger geofence (circle) is also determined in conjunction, and therefore, the determination is skipped. Moreover, for example, a circumcircle (or a circumscribing area, an inclusive range, or the like) is set for partially overlapping geofences, the geofences are regarded as one geofence if all the distances from the geofences to the circumcircle (or the circumscribing area, the inclusive range, or the like) are equal to or smaller than a setting value, the determination thereof is skipped similarly. In this way, the check-in determination apparatus 1 can determine check-in at a higher speed.

The block diagram used in description of the embodiment illustrates functional blocks. These functional blocks (configuration units) are realized by an arbitrary combination of hardware and/or software. Moreover, a realization method for realizing the respective functional blocks is not particularly limited. That is, the respective functional blocks may be realized by one apparatus which is physically or logically coupled or may be realized by a plurality of apparatuses which are physically or logically separated and which are directly and/or indirectly (for example, by cables and/or wirelessly) connected. The functional blocks may be realized by combining software with one apparatus or a plurality of apparatuses.

Examples of functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communication, forwarding, configuring, reconfiguring, allocating (mapping), assigning, and the like, but there is no limitation thereto. For example, a functional block (configuration unit) for performing transmission may be referred to as a transmitting unit or a transmitter. As described above, a realization method thereof is not particularly limited.

Figure 11:
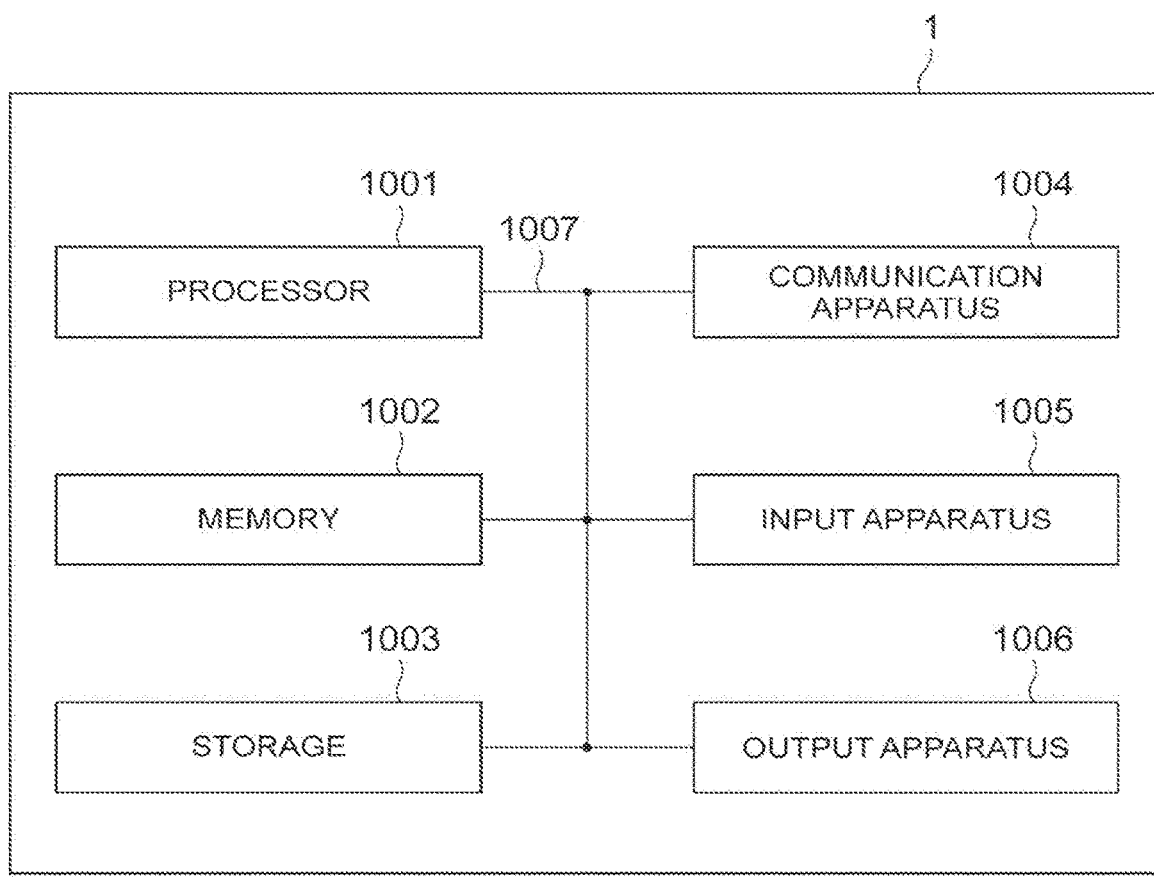
FIG. 11 is a diagram of a hardware configuration of the check-in determination apparatus according to the embodiment of the present invention.

For example, the check-in determination apparatus 1 and the like according to an embodiment of the present invention may function as a computer that performs a check-in determination process of the present disclosure. FIG. 11 is a diagram illustrating an example of a hardware configuration of the check-in determination apparatus 1 according to the present embodiment. The check-in determination apparatus 1 may be physically configured as a computer apparatus which includes a processor 1001, a memory 1002, a storage 1003, a communication apparatus 1004, an input apparatus 1005, an output apparatus 1006, a bus 1007, and the like.

In the following description, the word "apparatus" may be replaced with "circuit," "device," "unit," or the like. The hardware configuration of the check-in determination apparatus 1 may include one or a plurality of apparatuses illustrated in FIG. 11 and may not include some apparatuses.

The respective functions of the check-in determination apparatus 1 are realized when predetermined software (program) is read onto hardware such as the processor 1001, the memory 1002, and the like, the processor 1001 performs an operation, and the communication by the communication apparatus 1004 and the data read and/or written in the memory 1002 and the storage 1003 are controlled.

The processor 1001 operates an operating system to control the entire computer, for example. The processor 1001 may be configured as a central processing unit (CPU) that includes an interface to a peripheral apparatus, a control apparatus, an operation apparatus, a register, and the like. For example, the related geofence information creation unit 11, the position identifying information acquisition unit 13, the check-in determination unit 14, and the like may be realized by the processor 1001.

The processor 1001 reads a program (program codes), a software module, or data from the storage 1003 and/or the communication apparatus 1004 into the memory 1002 and executes various processes according to the program and the like. A program for causing a computer to execute at least a portion of the operations described in the embodiment is used as the program For example, the related geofence information creation unit 11, the position identifying information acquisition unit 13, and the check-in determination unit 14 may be realized by a control program which is stored in the memory 1002 and operated by the processor 1001, and the other functional blocks may be realized in the same way. Although it has been described that the above-described processes are executed by one processor 1001, the processes may be executed by two or more processors 1001 simultaneously or sequentially. One or more chips may be mounted in the processor 1001. The program may be transmitted from a network via a telecommunication circuit.

The memory 1002 is a computer-readable recording medium and may be configured as at least one of a read only memory (ROM), an erasable programmable ROM (EPROM), an electrically erasable programmable ROM (EEPROM), a random access memory (RANI), and the like, for example. The memory 1002 may be referred to as a register, a cache, a main memory (main storage device), and the like. The memory 1002 can store a program (program codes), a software module, and the like that can be executed to perform a wireless communication method according to an embodiment of the present invention.

The storage 1003 is a computer-readable recording medium and may be configured as at least one of an optical disc such as a compact disc (CD)-ROM, a hard disk drive, a flexible disk, an optomagnetic disc (for example, a compact disc, a digital versatile disc, or a Blu-ray (registered trademark) disc), a smartcard, a flash memory (for example, a card, a stick, or a key drive), a floppy (registered trademark) disk, a magnetic strip, and the like, for example. The storage 1003 may be referred to as an auxiliary storage apparatus. The above-described storage medium may be a database and a server, and any other appropriate medium that include the memory 1002 and/or the storage 1003.

The communication apparatus 1004 is hardware (a transmission and reception apparatus) for performing communication between computers via cables and/or a wireless network and is also referred to as a network device, a network controller, a network card, a communication module, and the like, for example. The communication apparatus 1004 may include a high-frequency switch, a duplexer, a filter, a frequency synthesizer, and the like in order to realize at least one of frequency division duplex (FDD) and time division duplex (TDD), for example. For example, the position identifying information acquisition unit 13, the check-in determination unit 14, and the like may be realized by the communication apparatus 1004.

The input apparatus 1005 is an input device (for example, a keyboard, a mouse, a microphone, a switch, a button, a sensor, and the like) that receives the input from the outside. The output apparatus 1006 is an output device (for example, a display, a speaker, an LED lamp, or the like) that outputs information to the outside. The input apparatus 1005 and the output apparatus 1006 may have an integrated configuration (for example, a touch panel).

The respective apparatuses such as the processor 1001 and the memory 1002 are connected by the bus 1007 for communicating information. The bus 1007 may be configured as a single bus and may be configured as different buses for respective apparatuses.

The check-in determination apparatus 1 may be configured to include hardware such as a microprocessor, a digital signal processor (DSP), an application specific integrated circuit (ASIC), a programmable logic device (PLD), a field programmable gate array (FPGA), and the like, and some or all of the respective functional blocks may be realized by the hardware. For example, the processor 1001 may be implemented by at least one of these items of hardware.

Notification of information is not limited to the aspects and embodiments described in the present disclosure but may be performed using another method.

The respective aspects and embodiments described in the present disclosure may be applied to Long Tenn Evolution (LTE), LTE-Advanced (LTE-A), SUPER 3G, IMT-Advanced, 4th generation mobile communication system (4G), 5th generation mobile communication system (5G), Future Radio Access (FRA), new radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system which uses other appropriate systems, and/or a next-generation system which is extended on the basis of these systems. Moreover, the respective aspects and embodiments described in the present disclosure may be applied to combinations of a plurality of systems (a combination of at least one of LTE and LTE-A and 5G).

The orders in the processing procedures, the sequences, the flowcharts, and the like described in the respective aspects and embodiments described in the present disclosure may be switched unless contradiction occurs. For example, in the method described in the present disclosure, although various steps are illustrated in an exemplary order, the steps are not limited to the illustrated specific order.

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (true or false), and may be made by comparison of numerical values (comparison with a predetermined value, for example).

The respective aspects and embodiments described in the present disclosure may be used solely, may be used in combination, and may be switched and used according to execution. Moreover, the notification (notification of "X," for example) of predetermined information is not limited to being performed explicitly but may be performed implicitly (for example, without performing the notification of the predetermined information).

While the present disclosure has been described above in detail using the embodiment, it is obvious to those skilled in the art that the present disclosure is not limited only to the embodiment described in the present disclosure. The present disclosure can also be embodied in other modified and altered forms without departing from the gist and scope of the present disclosure as defined in the appended claims. It is therefore to be understood that the disclosure of the present disclosure is intended for the purpose of description and exemplification but is not intended to limit the scope of the present disclosure.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language or other names.

Furthermore, software, instructions, information, and the like, may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared rays, radio, and microwave, these wired and/or wireless technologies are included within the definition of the transmission medium.

Information, signals, and the like described in the present disclosure may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The terms described in the present disclosure and/or the terms necessary for understanding of the present disclosure may be replaced with terms having the same or similar meaning.

The terms "system" and "network" as used in the present disclosure are used interchangeably.

Furthermore, the information, parameters, and the like described in the present disclosure may be represented by absolute values, may be represented as relative values from predetermined values, or may be represented by any other corresponding information.

The names used for the above-described parameters are not limiting names in any respect. Furthermore, numerical formulae using these parameters may be different from those explicitly disclosed in the present disclosure.

In the present disclosure, the terms "mobile station (MS)", "user terminal", "user equipment (UE)", and "terminal" can be used interchangeably.

The terms "determine (determining)" and "decide (determining)" used in the present disclosure may include various types of operations. For example, "determining" and "deciding" may include considering that a result of judging, calculating, computing, processing, deriving, investigating, looking up (search or inquiry) (for example, search in a table, a database, or another data structure), or ascertaining is "determined" or "decided". Furthermore, "determining" and "deciding" may include, for example, considering that a result of receiving (for example, reception of information), transmitting (for example, transmission of information), inputting, outputting, or accessing (for example, accessing data in memory) is "determined" or "decided". Furthermore, "determining" and "deciding" may include considering that a result of resolving, selecting, choosing, establishing, or comparing is "determined" or "decided". That is, "determining" and "deciding" may include considering that a certain operation is "determined" or "decided". Moreover, "determining (deciding)" may be replaced with "assuming," "expecting," "considering," and the like.

The terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be replaced with "access". As used in the present disclosure, when two elements are connected, these elements may be considered "connected" or "coupled" to each other using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

The expression "on the basis of" used in the present disclosure does not mean "on the basis of only" unless particularly stated otherwise. In other words, the expression "on the basis of" means both "on the basis of only" and "on the basis of at least".

In the configurations of the respective apparatuses, "means" may be replaced with "unit", "circuit", "device", and the like.

As long as "include," "including," and variations thereof are used in the present disclosure or the claims, these terms are intended to be inclusive in a manner similar to the expression "comprising". Furthermore, the expression "or" used in the specification or claims is not intended to mean an exclusive logical sum.

In the present disclosure, when English articles such as a, an, and the are added to an element in the translated English text, for example, such an element to which these articles are added may be provided plurally.

In the present disclosure, the phrase "A and B are different" may mean "A and B are different from each other". The phrase may mean "A and B each are different from C". The terms such as "separate" "coupled" and the like may be interpreted similarly as "different".

REFERENCE SIGNS LIST

1: Check-in determination apparatus
2: Terminal
3: Check-in determination system
10: Geofence information storage unit
11: Related geofence information creation unit
12: Related geofence information storage unit
13: Position identifying information acquisition unit
14: Check-in determination unit

The invention claimed is:

1. A check-in determination apparatus configured to determine check-in indicating that a terminal has entered a geofence which is a prescribed geographic area, comprising processing circuitry configured to:
   store related geofence information in which a related geofence which is another geofence is correlated with each of geofences on the basis of a distance to the geofence; and
   determine check-in of the terminal sequentially with respect to each of the geofences, wherein
   when it is determined that the terminal has checked into one geofence, the processing circuitry determines that the terminal has also checked into the related geofence correlated with the one geofence in the stored related geofence information and excludes the related geofence correlated with the one geofence in the stored related geofence information from determination targets in subsequent determination.

2. The check-in determination apparatus according to claim 1, wherein
the related geofence that at least a portion of a geographic area of the geofence overlaps is correlated with each geofence in the related geofence information.

3. The check-in determination apparatus according to claim 1, wherein
the related geofence that includes all geographic areas of the geofence is correlated with each geofence in the related geofence information.

4. The check-in determination apparatus according to claim 1, wherein
the processing circuitry determines check-in of the terminal in ascending order of geographic areas of each geofences.

5. The check-in determination apparatus according to claim 1, wherein the processing circuitry further configured to:
create related geofence information, and
store the created related geofence information.

6. The check-in determination apparatus according to claim 1, wherein
the related geofence that at least a portion of a geographic area of the geofence overlaps is correlated with each geofence in the related geofence information.

\* \* \* \* \*